US010421426B2

(12) United States Patent
Odai et al.

(10) Patent No.: US 10,421,426 B2
(45) Date of Patent: Sep. 24, 2019

(54) OCCUPANT PROTECTION DEVICE

(71) Applicant: HONDA MOTOR CO., LTD, Minato-ku, Tokyo (JP)

(72) Inventors: Shinsuke Odai, Saitama (JP); Kento Maeda, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 15/794,125

(22) Filed: Oct. 26, 2017

(65) Prior Publication Data

US 2018/0118152 A1    May 3, 2018

(30) Foreign Application Priority Data

Nov. 1, 2016   (JP) .................................. 2016-214506

(51) Int. Cl.
*B60R 21/231* (2011.01)
*B60R 21/239* (2006.01)
*B60R 21/206* (2011.01)
*B60R 21/216* (2011.01)
*B60R 21/235* (2006.01)

(52) U.S. Cl.
CPC .......... *B60R 21/231* (2013.01); *B60R 21/206* (2013.01); *B60R 21/216* (2013.01); *B60R 21/239* (2013.01); *B60R 2021/23107* (2013.01); *B60R 2021/23169* (2013.01); *B60R 2021/23566* (2013.01)

(58) Field of Classification Search
CPC ... B60R 21/231; B60R 21/206; B60R 21/216; B60R 21/239; B60R 2021/23566; B60R 2021/23169; B60R 2021/23107
See application file for complete search history.

(56) References Cited

U.S. PATENT DOCUMENTS

| 2005/0062265 A1* | 3/2005 | Hotta | B60R 21/206 |
| | | | 280/730.1 |
| 2008/0116669 A1* | 5/2008 | Adachi | B60R 21/203 |
| | | | 280/730.1 |

(Continued)

FOREIGN PATENT DOCUMENTS

| JP | 2000-198408 | 7/2000 |
| JP | 2004-050932 | 2/2004 |

(Continued)

OTHER PUBLICATIONS

Japanese Office Action for Japanese Patent Application No. 2016-214506 dated Jun. 12, 2018.

*Primary Examiner* — Darlene P Condra
(74) *Attorney, Agent, or Firm* — Amin, Turocy & Watson LLP (57) ABSTRACT

Provided is an occupant protection device which is disposed side by side with an under-cover of an instrument panel and has a harness connected to an inflator disposed on a front side of the under-cover in a vehicle traveling direction to protect a knee portion of an occupant, including a case having a side wall on which the harness is disposed, and a protrusion configured to extend from the side wall of the case toward a front of the under-cover in forward and backward direction of a vehicle, to come in contact with the under-cover, and to restrict movement of the under-cover to the front side in the forward and backward direction of the vehicle.

5 Claims, 8 Drawing Sheets

(56) References Cited

U.S. PATENT DOCUMENTS

| | | | | |
|---|---|---|---|---|
| 2009/0152839 A1* | 6/2009 | Thomas | ............... | B60R 21/206 |
| | | | | 280/728.2 |
| 2010/0253050 A1* | 10/2010 | Mitsuo | ............... | B60R 21/2032 |
| | | | | 280/730.1 |
| 2010/0317202 A1* | 12/2010 | Coiffier | ................... | B62D 5/04 |
| | | | | 439/34 |
| 2017/0088081 A1* | 3/2017 | Kojima | .............. | B60R 21/2171 |
| 2018/0118149 A1* | 5/2018 | Odai | ...................... | B60R 21/20 |

FOREIGN PATENT DOCUMENTS

| | | |
|---|---|---|
| JP | 2004-203222 | 7/2004 |
| JP | 2004-276682 | 10/2004 |
| JP | 2005-104207 | 4/2005 |
| JP | 2008-120290 | 5/2008 |
| JP | 2010-047221 | 3/2010 |

* cited by examiner

OCCUPANT PROTECTION DEVICE

CROSS-REFERENCE TO RELATED APPLICATION

Priority is claimed on Japanese Patent Application No. 2016-214506, filed Nov. 1, 2016, the content of which is incorporated herein by reference.

BACKGROUND OF THE INVENTION

Field of the Invention

The present invention relates to an occupant protection device.

Description of Related Art

A knee airbag device for protecting a knee portion of an occupant by inflating and deploying a bag body from a front of a front seat at the time of an input of an impact is known as an occupant protection device of a vehicle. In the knee airbag device, a bag body and an inflator are disposed in a case. An end portion of the inflator protrudes from a perimeter wall portion of the case, and a wire harness (hereinafter, referred to as a harness) is connected to the end of the inflator.

Some knee airbag devices are accommodated inside a door of a glove box (container). According to this knee air bag device, a protruding portion protrudes outward from the perimeter wall portion of the case in a semicircular arc shape, and the end portion of the inflator is covered by the projecting portion from a rear side thereof. Therefore, when water intrudes into the door of the glove box, it is possible to prevent a connection portion between the inflator and the harness from becoming wet from the intruding water (refer to, for example. Japanese Unexamined Patent Application, First Publication No. 2010-47221).

SUMMARY OF THE INVENTION

However, when the knee airbag device disclosed in Japanese Unexamined Patent Application, First Publication No. 2010-47221 is disposed outside the door of the glove box, it is conceivable that the knee airbag device is disposed in parallel with an under-cover of an instrument panel. In this state, when a load is input to the under-cover, a method of protecting the connection portion between the inflator and the harness from the under-cover is required.

Further, when the knee airbag device and the under-cover are disposed side by side, a method of preventing the under-cover from interrupting the deploying of the bag body at the time of deploying the bag body is required.

An aspect of the present invention has been made in view of such circumstances, and an object thereof is to provide an occupant protection device which is capable of protecting a connection portion between an inflator and a harness from an under-cover and also capable of preferably deploying a bag body.

In order to solve the above problem, the present invention adopts the following aspects.

(1) Provided is an occupant protection device of an aspect according to the present invention which is disposed in parallel with an under-cover of an instrument panel and has a harness connected to an inflator disposed on a front side of the under-cover in a vehicle traveling direction to protect a knee portion of an occupant, including a case having a side wall on which the harness is disposed, and a protrusion configured to extend from the side wall of the case toward a front of the under-cover in the forward and backward direction of a vehicle, to come in contact with the under-cover, and to restrict movement of the under-cover to the front side in the forward and backward direction of the vehicle.

As described above, the harness is disposed on the side wall of the case. Further, the protrusion is formed on the side wall of the case, and the protrusion is brought into contact with the under-cover. Therefore, movement of the under-cover to the front side in the vehicle traveling direction can be restricted by the protrusion, and thus the protrusion can protect the harness from the under-cover.

Here, the under-cover is disposed on the rear side of the protrusion in the vehicle traveling direction. The protrusion is formed on the side wall of the case. Therefore, the under-cover can be disposed away from the case on the rear side of the side wall of the case in the vehicle traveling direction. Thus, when the bag body is deployed, the bag body can be satisfactorily deployed, since hindering of deployment of the bag body by the under-cover can be prevented.

(2) In the aspect of (1), the harness may be connected to the inflator by a connector.

Here, the protrusion protrudes from the side wall of the case toward the front of the under-cover in the forward and backward direction of the vehicle. Therefore, the connector can be protected from the under-cover by the protrusion. Accordingly, for example, it is not necessary to cover the connector, and the harness can be easily connected to the inflator by the connector.

(3) In the aspect of (1) or (2), the protrusion may cover at least a part of the harness, and an end portion thereof on a rear side in the vehicle traveling direction may be provided on a rear side of the harness.

As described above, at least a part of the harness is covered by the protrusion, and the end portion of the protrusion on the rear side in the vehicle traveling direction is disposed on the rear side from the harness. Therefore, the end portion of the protrusion on the rear side in the vehicle traveling direction can be disposed on the under-cover side of the harness. Accordingly, before the under-cover comes into contact with the harness, the protrusion can firmly receive the movement of the under-cover to the front side in the vehicle traveling direction and thus can protect the harness from the under-cover.

(4) In the aspect of any one of (1) to (3), a lengthwise direction of the protrusion may be a thickness direction of the case.

Here, the thickness direction of the case is the direction of one of three sides from a length, a width and a height of the case (i.e., case body) which has the smallest dimension. Therefore, the protrusion is provided so that the lengthwise direction is the thickness direction of the case. Accordingly, it possible to increase rigidity in the thickness direction of the case due to the protrusion.

(5) In the aspect of any one of (1) to (4), the case may have a cover portion which is opened by breaking a breakable portion including a perforated portion and a thinned portion, and a connection portion between the perforated portion and the thinned portion may be disposed at a position of the protrusion along an extension line in the lengthwise direction.

As described above, the connection portion between the perforated portion and the thinned portion is disposed at a position of the protrusion along the extension line. Therefore, the rigidity in the vicinity of the connection portion between the perforated portion and the thinned portion can be ensured by the projection. By ensuring the rigidity in the vicinity of the connection portion, the perforated portion can be satisfactorily broken to the connection portion by the deploying force of the bag body. Furthermore, when the perforated portion is broken to the connection portion, the cutting force due to the breakage can be satisfactorily transmitted to the thinned portion.

Therefore, the thinned portion can be broken satisfactorily and the base portion of the cover portion can also be reliably broken. As a result, the cover portion can be satisfactorily opened with the base portion as a fulcrum by the deploying force of the bag body.

According to the aspect of the present invention, the protrusion is formed on the side wall of the case, and the protrusion is brought into contact with the under-cover. Thus, when the load is input to the under-cover, the connection portion between the inflator and the harness can be protected from the under-cover.

Further, the under-cover is disposed on the rear side of the side wall of the case in the vehicle traveling direction to be away from the case. Accordingly, when the bag body is deployed, it is possible to satisfactorily deploy the bag body by preventing the deploying of the bag body from being hindered by the under-cover.

DETAILED DESCRIPTION OF THE INVENTION

Next, one embodiment of the present invention will be described with reference to the drawings. In the drawings, an arrow FR indicates a front of a vehicle, an arrow UP indicates an upper side of a vehicle, and the arrow LH indicates a left side of a vehicle.

Figure 1:
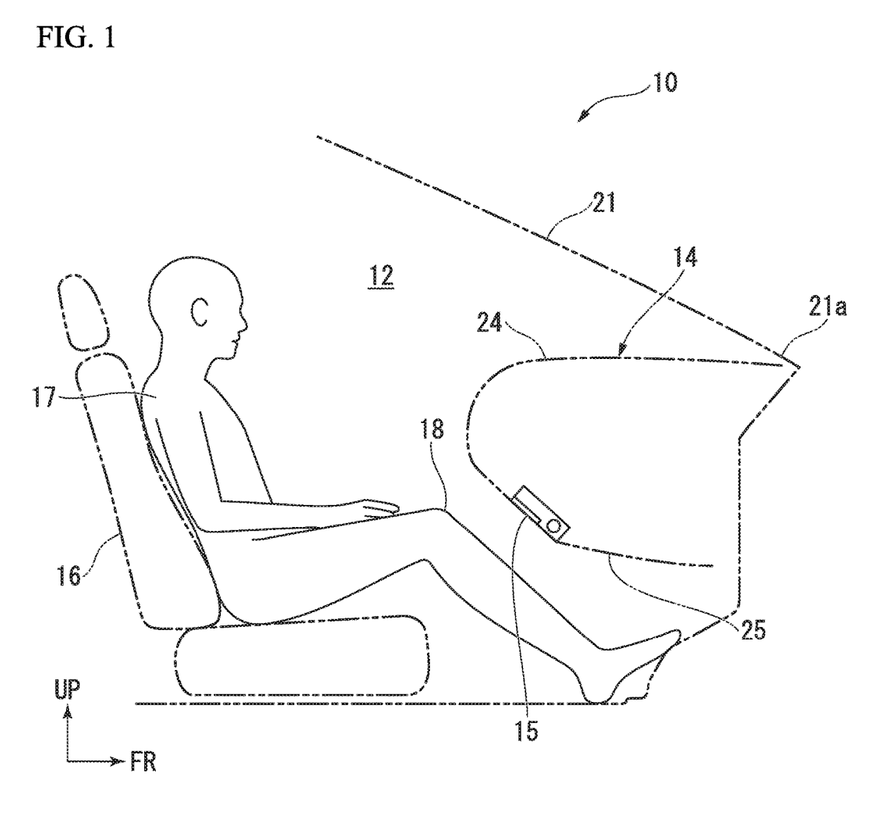
FIG. 1 is a cross-sectional view illustrating a vehicle equipped with an occupant protection device according to one embodiment of the present invention.

As illustrated in FIG. 1, a vehicle 10 includes an instrument panel 14 provided in a vehicle compartment 12 on a front side of a vehicle, an occupant protection device 15 disposed in parallel with the instrument panel 14, and a passenger seat 16 provided on the vehicle rear side of the occupant protection device 15.

In a state in which an occupant 17 is seated on the passenger seat 16, an occupant protection device 15 is provided at a knee portion 18 of the occupant 17 on the front side of the vehicle.

The occupant protection device 15 is a knee airbag device which protects the knee portion 18 of the occupant 17.

The instrument panel 14 includes an upper cover 24 which protrudes from a lower end 21a of a front windshield 21 toward the vehicle compartment 12 side, and an under-cover 25 which protrudes from a lower end 24b of the upper cover 24 toward the front side of the vehicle. The occupant protection device 15 is disposed side by side with the under-cover 25.

Figure 2:
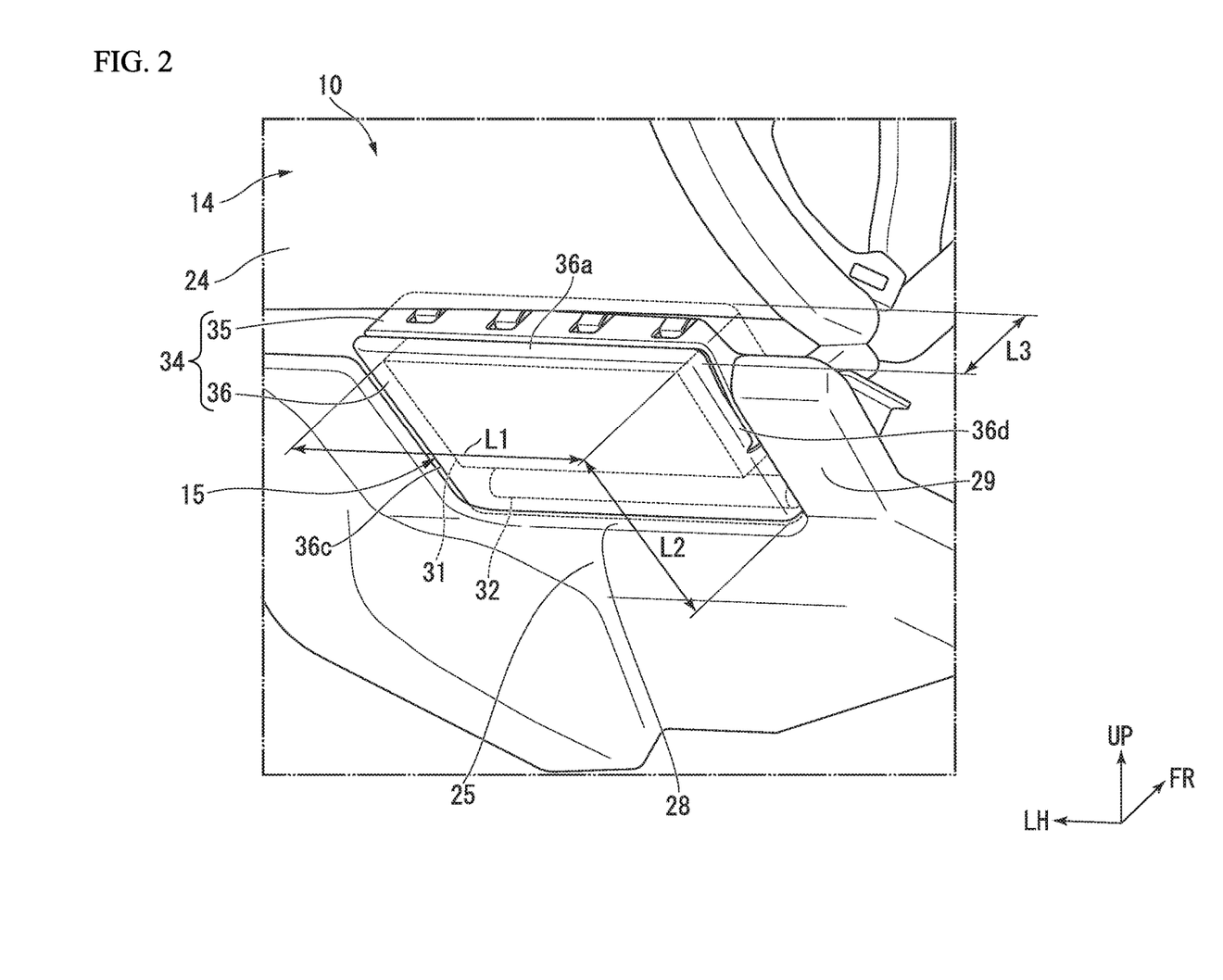
FIG. 2 is a perspective view illustrating a state in which the occupant protection device according to one embodiment of the present invention is seen from a vehicle compartment side.

As illustrated in FIG. 2, the under-cover 25 is disposed obliquely below the upper cover 24 to be parallel with the occupant protection device 15. Specifically, the under-cover 25 has a concave portion 28 of which an upper portion is open and an outer cover portion 29 which forms an outer side of the concave portion 28.

The occupant protection device 15 is disposed in the concave portion 28. The outer cover portion 29 is disposed on the vehicle rear side of the occupant protection device 15 outside the occupant protection device 15 in a vehicle width direction.

Like the under-cover 25, the occupant protection device 15 is disposed in the vehicle width direction and is also disposed to be inclined downward toward the front side of the vehicle along the under-cover 25. In this state, the occupant protection device 15 is disposed on a front side of the under-cover 25 (particularly, the outer cover portion 29) in a vehicle traveling direction. In other words, the occupant protection device 15 is disposed on the vehicle front side of the outer cover portion 29.

The occupant protection device 15 includes a bag body 31 which is inflated and deployed by receiving a gas pressure, an inflator 32 which supplies a high pressure gas to the bag body 31 when an impact load is input to a vehicle 10, and a case 34 which accommodates the bag body 31 and the inflator 32.

The case 34 is formed of a case body having a length dimension L1, a height dimension L2, and a width dimension L3. Further, the case 34 includes an accommodation case 35 which accommodates the bag body 31 and the inflator 32, and a cover portion 36 which covers the bag body 31 and the inflator 32 from a lower side thereof.

Figure 3:
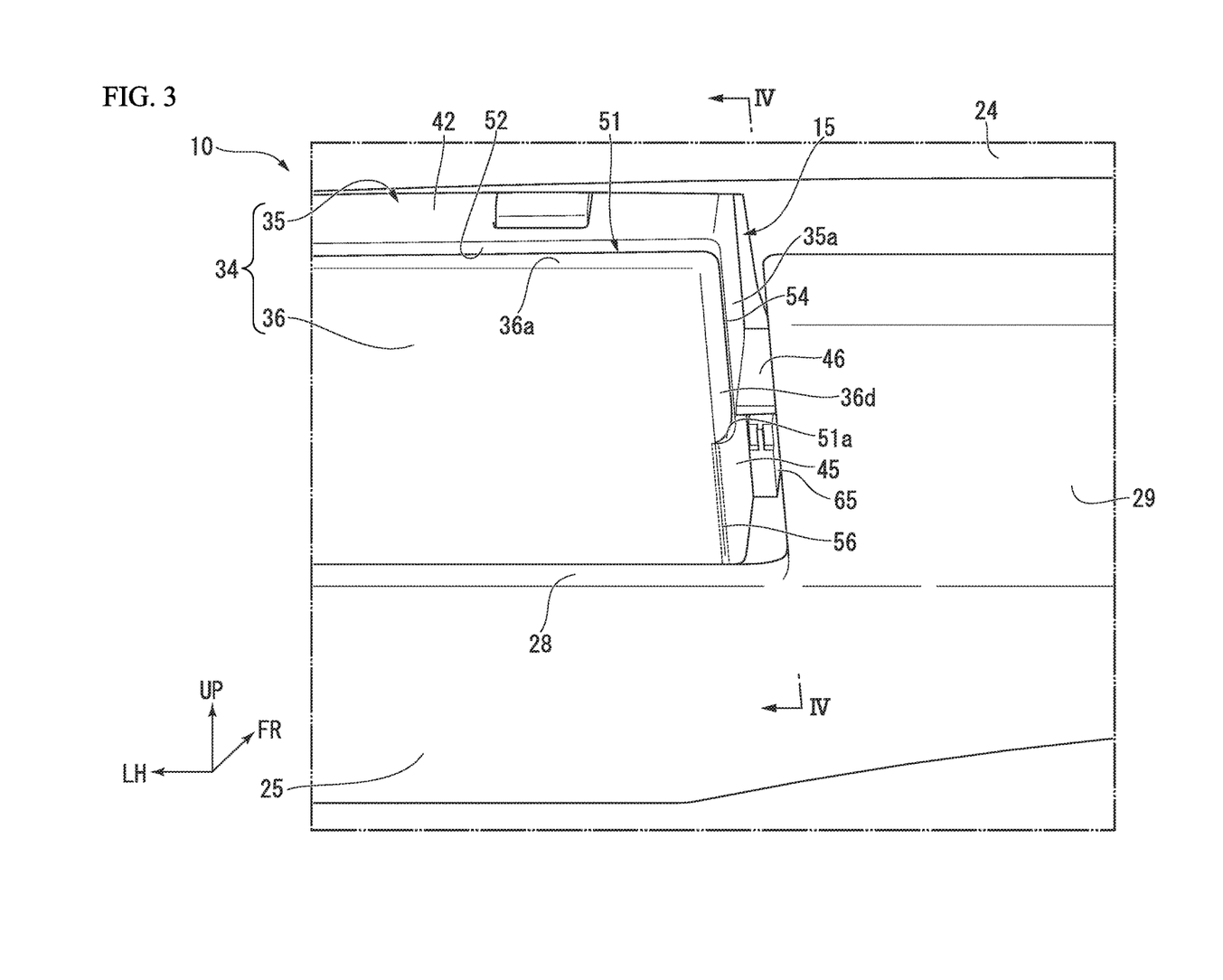
FIG. 3 is a perspective view illustrating a relationship between the occupant protection device and an under-cover in one embodiment of the present invention.
Figure 4:
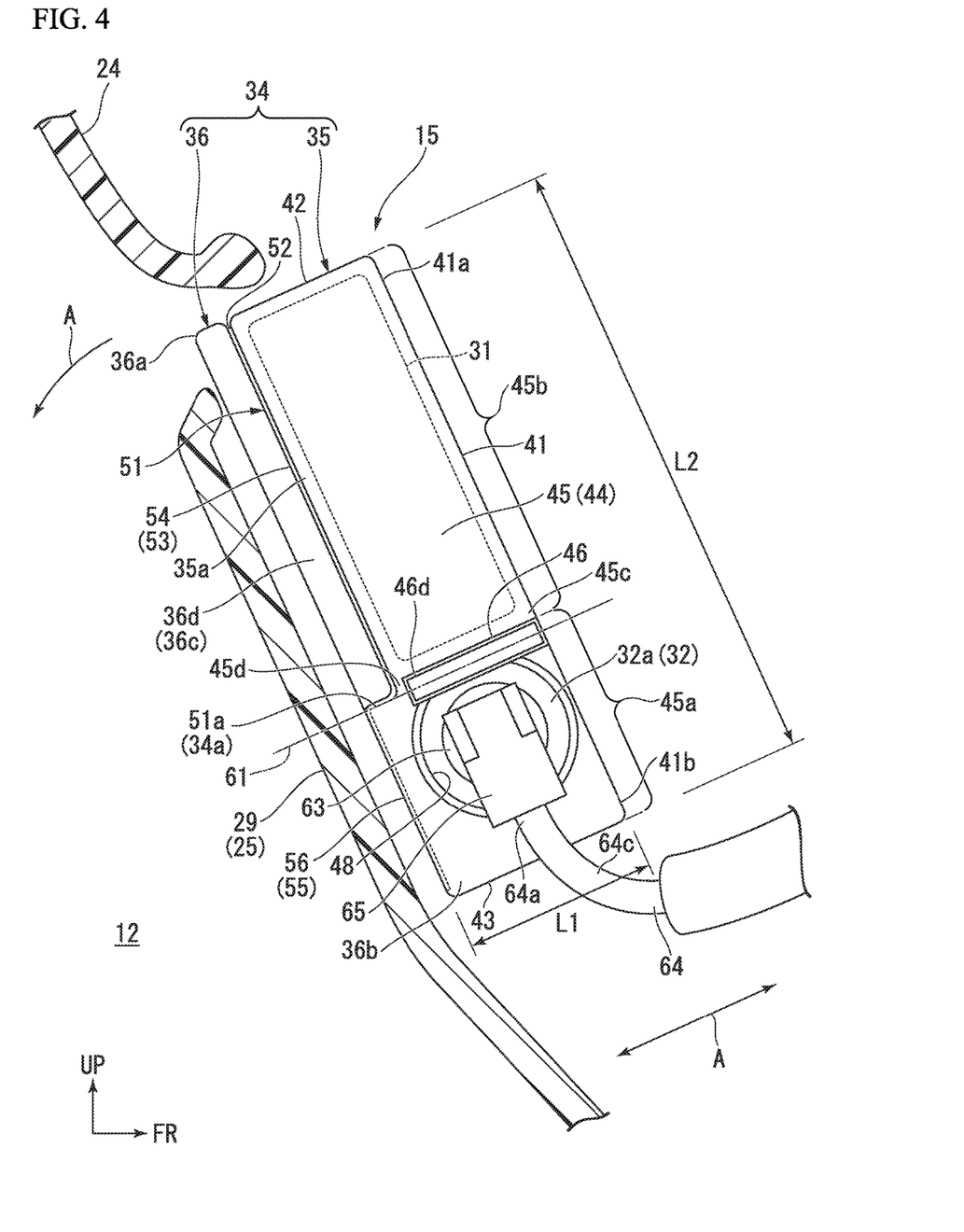
FIG. 4 is a cross-sectional view taken along line IV-IV of FIG. 3 in one embodiment of the present invention.

As illustrated in FIGS. 3 and 4, the folded bag body 31 is accommodated in the accommodation case 35 together with the inflator 32. The inflator 32 is disposed on a front side of the outer cover portion 29 in the vehicle traveling direction (i.e., in the front side of the vehicle).

The accommodation case 35 has a back wall 41, an upper wall 42, a lower wall 43, an inner wall 44, an outer wall 45 and a protrusion 46.

The back wall 41 is formed in a rectangular shape to cover a back surface side of the folded bag body 31 and is also disposed obliquely to be inclined downward from an upper side 41a to a lower side 41b. The upper wall 42 protrudes from the upper side 41a of the back wall 41 toward the rear side of the vehicle. The lower wall 43 protrudes from the lower side 41b of the back wall 41 toward the front side of the vehicle.

Further, the inner wall 44 protrudes from an inner side of the back wall 41 toward the rear side of the vehicle. The outer wall 45 protrudes from an outer side of the back wall 41 toward the front side of the vehicle. The protrusion 46 is provided on a lower portion 45a of the outer wall 45, and an opening 48 is provided below the protrusion 46.

The protrusion 46 and the opening 48 will be described later in detail.

The accommodation case 35 is formed by the back wall 41, the upper wall 42, the lower wall 43, the inner wall 44 and the outer wall 45 and has a rectangular body of which a front is open. The accommodation case 35 is installed on a fixing member on a vehicle body side. The cover portion 36 is integrally provided on a front portion 35a of the accommodation case 35.

Like the back wall 41, the cover portion 36 is formed in a rectangular shape and has an upper side 36a, a lower side 36b, an inner side 36c and an outer side 36d.

The upper side 36a of the cover portion 36 and a rear side of the upper wall 42 are connected by a first perforated portion 52. An upper portion of the inner side 36c of the cover portion 36 and an upper portion of a rear side of the inner wall 44 are connected by a second perforated portion 53. An upper portion of the outer side 36d of the cover portion 36 and an upper portion of a rear side of the outer wall 45 are connected by a third perforated portion 54.

Perforations are formed in the first perforated portion 52, the second perforated portion 53 and the third perforated portion 54.

A lower portion of the inner side 36c of the cover portion 36 and a lower portion of the rear side of the inner wall 44 are connected by a fourth thinned portion 55. A lower portion of the outer side 36d of the cover portion 36 and a lower portion of the rear side of the outer wall 45 are connected by a fifth thinned portion 56.

Thinned portions are formed at the fourth thinned portion 55 and the fifth thinned portion 56.

Therefore, a breakable portion (so-called tear line) 51 is formed at the first perforated portion 52, the second perforated portion 53, the third perforated portion 54, the fourth thinned portion 55 and the fifth thinned portion 56.

The breakable portion 51 is a portion which is broken by a deploying force of the bag body 31.

Further, the lower side 36b of the cover portion 36 is a base portion which serves as a fulcrum when the breakable portion 51 is broken and the cover portion 36 is opened in a direction of an arrow A.

Figure 5:
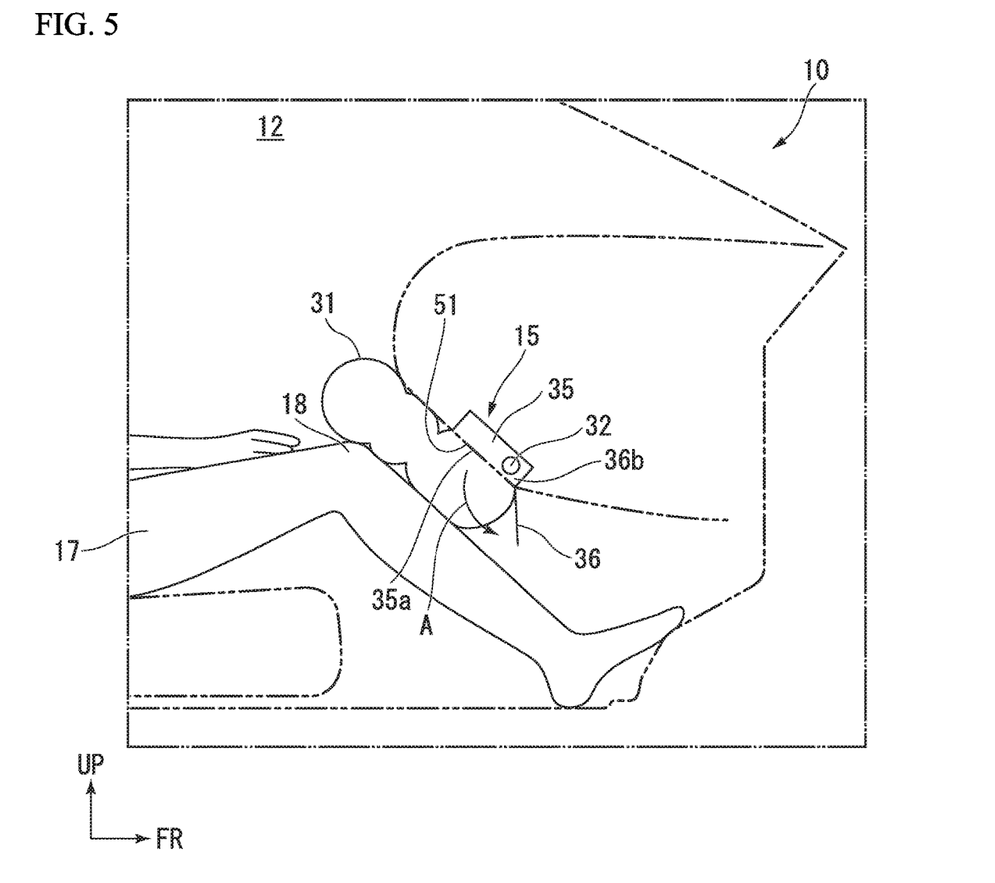
FIG. 5 is a cross-sectional view illustrating a state in which a bag body of the occupant protection device in one embodiment of the present invention is deployed.

As illustrated in FIG. 5, a gas is supplied from the inflator 32 to the bag body 31, and the bag body 31 is inflated and deployed, and thus the breakable portion 51 is broken by the deploying force of the bag body 31. When the breakable portion 51 is broken, the cover portion 36 is opened as indicated by the arrow A with the lower side 36b of the cover portion 36 as a fulcrum.

By opening the cover portion 36, the front portion 35a of the accommodation case 35 is opened. The bag body 31 is deployed into the vehicle compartment 12 from an opening at a lower end. The knee portion 18 of the occupant 17 is protected by the deployed bag body 31.

Figure 6:
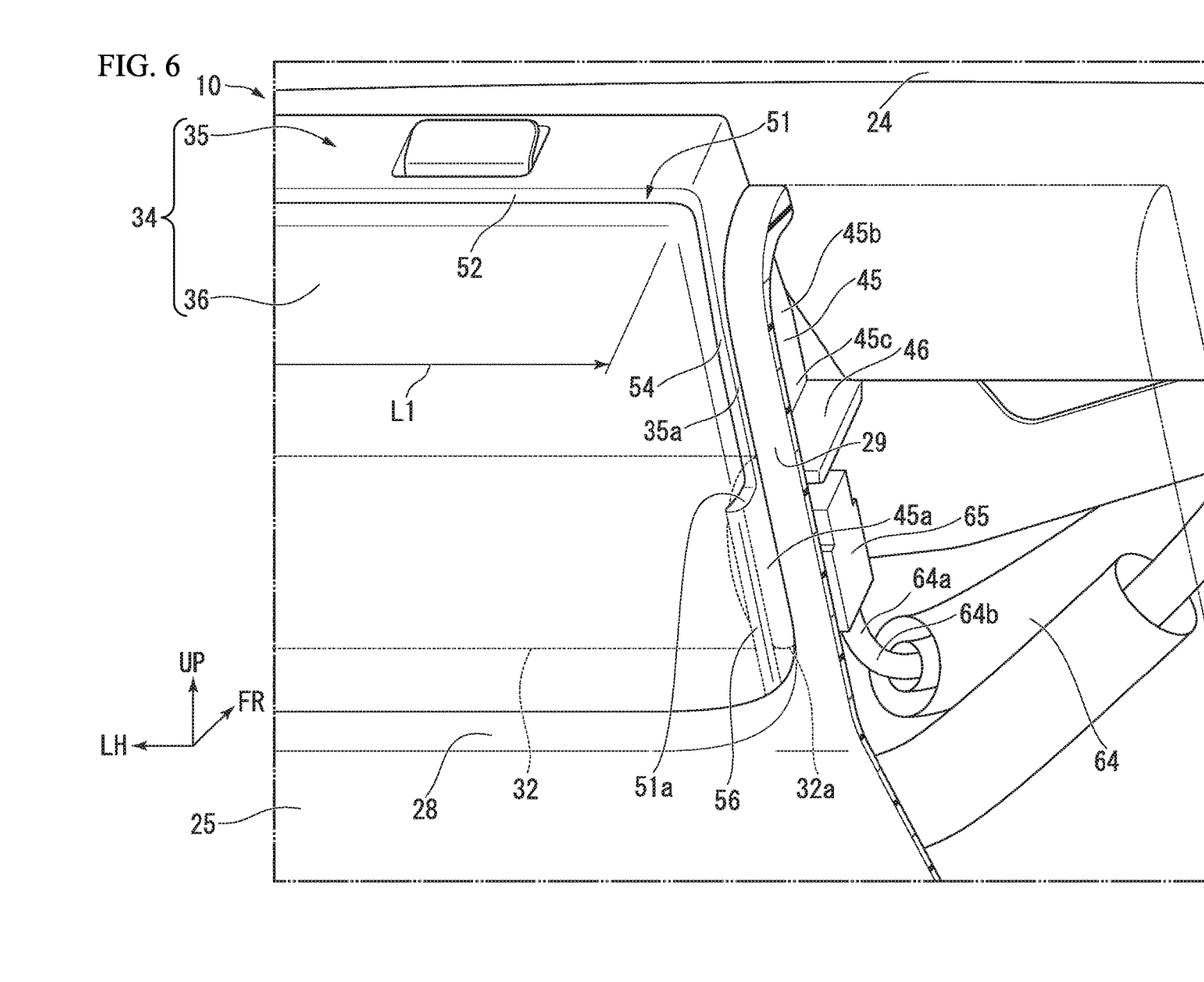
FIG. 6 is a perspective view illustrating a relationship between a protrusion of the occupant protection device and the under-cover in one embodiment of the present invention.

As illustrated in FIGS. 4 and 6, the protrusion 46 is provided on the lower portion 45a of the outer wall 45 of the accommodation case 35. Also, the opening 48 is provided in the lower portion 45a below the protrusion 46.

The protrusion 46 protrudes from the outer wall 45 toward a front of the outer cover portion 29 in forward and backward direction of the vehicle. Specifically, the protrusion 46 linearly extends from a front side 45c of the outer wall 45 to a vicinity 45d of a connection portion 51a in the lower portion 45a of the outer wall 45.

The connection portion 51a is a portion in which the third perforated portion 54 and the fifth thinned portion 56 are connected at a boundary between the lower portion 45a and the upper portion 45b of the outer wall 45.

That is, the protrusion 46 is a member of which a lengthwise direction is a thickness direction (i.e., the direction of the arrow A) of the case 34. The thickness direction A of the case 34 is a direction of one of three sides of a length of the case 34, a width of the case 34 and a height of the case 34 which has the smallest dimension.

Specifically, the case 34 is formed of the case body having the length dimension L1, the height dimension L2 and the width dimension L3. Further, the length dimension L1, the height dimension L2 and the width dimension L3 of the case 34 satisfy a relationship of length dimension L1>height dimension L2>width dimension L3.

Therefore, a direction of the width dimension L3 in the case 34 is a thickness direction (i.e., the direction of the arrow A) of the case 34. As described above, the protrusion 46 is provided with the thickness direction of the case 34 as the lengthwise direction. Accordingly, rigidity of the case 34 in the thickness direction can be increased by the protrusion 46.

Further, the connection portion 51a is disposed at a position 34a of the protrusion 46 along an extension line 61 of the case 34 in the lengthwise direction (the direction of the arrow A). Therefore, the rigidity in the vicinity of the connection portion 51a is ensured by the protrusion 46. By ensuring the rigidity in the vicinity of the connection portion 51a, the third perforated portion 54 can be satisfactorily broken up to the connection portion 51a by the deploying force of the bag body 31.

Also, when the third perforated portion 54 is broken to the connection portion 51a, it is possible to satisfactorily transfer a cutting force due to the breakage from the connection portion 51a to the fifth thinned portion 56. Therefore, the fifth thinned portion 56 can be satisfactorily broken and reliably broken to the lower side 36b of the cover portion 36. Accordingly, the cover portion 36 can be satisfactorily opened as indicated by the arrow A with the lower side 36b as a fulcrum by the deploying force of the bag body 31.

Figure 7:
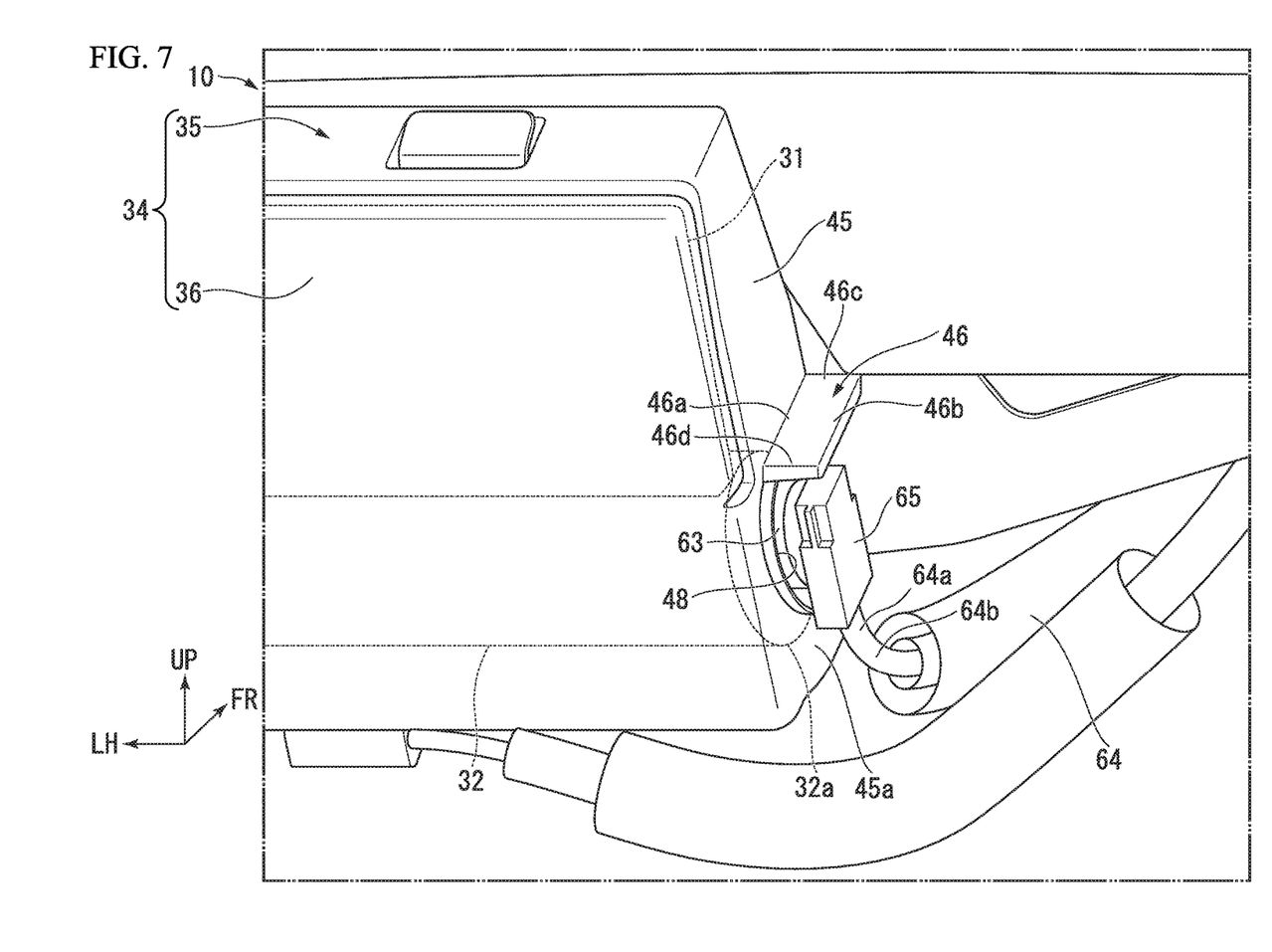
FIG. 7 is a perspective view illustrating a relationship between the occupant protection device and a harness in one embodiment of the present invention.

As illustrated in FIG. 7, the protrusion 46 protrudes outward from the lower portion 45a of the outer wall 45 in the vehicle width direction. The protrusion 46 is formed in a rectangular shape in a plan view by a proximal end 46a, a distal end 46b, a front end 46c and a rear end 46d. Hereinafter, the rear end 46d is referred to as a "protrusion rear end 46d". The protrusion rear end 46d is an end portion on a rear side in the vehicle traveling direction. The protrusion rear end 46d extends in the vehicle width direction and is disposed to overlap with the outer cover portion 29 in the vehicle width direction.

An end portion 32a of the inflator 32 is disposed below the protrusion 46. The end portion 32a of the inflator 32 is disposed in the opening 48 of the outer wall 45 of the accommodation case 35. A connector 63 is provided at the end portion 32a of the inflator 32. A connector 65 of a harness 64 is connected to the connector 63 of the inflator 32. An end portion 64a of the harness 64 is connected to the connector 65.

That is, the harness 64 is connected to the inflator 32 via the connector 63 and the connector 65. Therefore, when an impact load is input to the vehicle 10, an electrical signal is input from an airbag operating circuit to the inflator 32 via the harness 64, and a gas generating agent of the inflator 32 is ignited. Accordingly, a high pressure gas is supplied from the inflator 32 to the bag body 31.

Returning to FIGS. 4 and 6, the protrusion 46 protrudes from the outer wall 45 of the accommodation case 35 toward the front of the outer cover portion 29 in the forward and backward direction of the vehicle. Therefore, the connector 65 of the harness 64 can be protected from the outer cover portion 29 by the protrusion 46.

Therefore, for example, in order to protect the harness 64 and the connector 65, it is not necessary to cover them with a cover as a separate member. Accordingly, the harness 64 can be easily connected to the end portion 32a of the inflator 32 by the connector 65.

Here, the harness 64 is connected to the end portion 32a of the inflator 32, and thus the harness 64 (particularly, the end portion 64a of the harness 64) is disposed along the outer wall 45. In this state, the protrusion 46 is provided above the harness 64 and the connector 65.

The protrusion 46 covers at least a part of the harness 64 (particularly, a portion 64b on the end portion 64a side of the harness 64), and the protrusion rear end 46d is disposed on the vehicle rear side of the harness 64.

Figure 8:
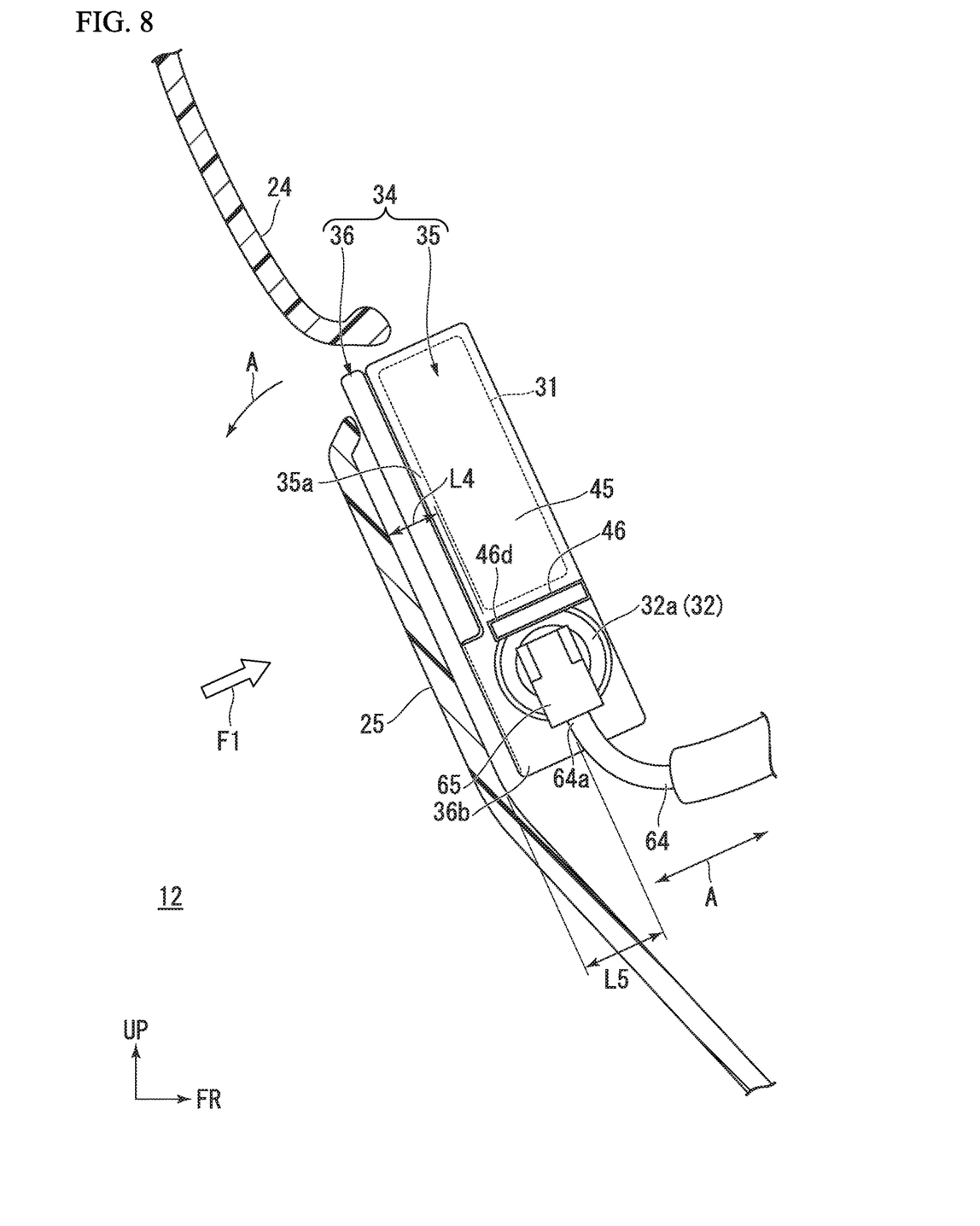
FIG. 8 is a cross-sectional view illustrating a state in which the harness is protected by the protrusion of the occupant protection device in one embodiment of the present invention.

As illustrated in FIG. 8, the protrusion 46 protrudes from the outer wall 45 of the accommodation case 35 toward the front of the outer cover portion 29 in the forward and backward direction of the vehicle. Also, a shortest distance between the protrusion 46 and the outer cover portion 29 is set to L4. Specifically, a distance between the protrusion rear end 46d of the protrusion 46 and the outer cover portion 29 is the shortest distance L4.

Meanwhile, a shortest distance between the harness 64 and the outer cover portion 29 is set to L5. Specifically, a distance between the end portion 64a of the harness 64 and the outer cover portion 29 is the shortest distance L5.

The shortest distance L4 is set to be smaller than the shortest distance L5.

The protrusion 46 (particularly, the protrusion rear end 46d) is disposed to overlap with the outer cover portion 29 in the vehicle width direction. Therefore, when the outer cover portion 29 moves toward the front of the vehicle due to the load F1, the outer cover portion 29 is brought into contact with the protrusion rear end 46d of the protrusion 46. Accordingly, movement of the outer cover portion 29 toward the front in the vehicle traveling direction is restricted by the protrusion 46.

Therefore, before the outer cover portion 29 comes in contact with the harness 64, the protrusion 46 can firmly receive the movement of the outer cover portion 29 toward the front in the vehicle traveling direction. Thus, the harness 64 can be protected from the outer cover portion 29 by the protrusion 46.

Here, the outer cover portion 29 is disposed on the rear side in the vehicle traveling direction of the projection 46. Further, the protrusion 46 is formed on the outer wall 45 of the accommodation case 35. Therefore, the outer cover portion 29 is disposed away from the accommodation case 35 on the rear side of the outer side wall 45 of the accommodation case 35 in the vehicle traveling direction. Thus, the bag body 31 can be satisfactorily deployed so that the outer cover portion 29 does not hinder the deploying of the bag body 31.

Specifically, due to the deploying force of the bag body 31, the cover portion 36 is opened as indicated by an arrow A with the lower side 36b of the cover portion 36 as a fulcrum. By opening the cover portion 36, the bag body 31 is deployed from the opening of the front portion 35a of the accommodation case 35 toward the vehicle compartment 12 side. Here, the outer cover portion 29 is disposed away from the accommodation case 35. Therefore, the bag body 31 can be satisfactorily deployed so that the outer cover portion 29 does not hinder the deploying of the bag body 31.

In addition, the technical scope of the present invention is not limited to the above-described embodiment, and various modifications can be made without departing from the gist of the present invention.

For example, in the above-described embodiment, an example in which the protrusion 46 is provided above the harness 64 and at least a part (particularly, the portion 64b on the end portion 64a side of the harness 64) of the harness 64 is covered from an upper side thereof by the protrusion 46 has been described. However, the present invention is not limited thereto.

For example, the protrusion 46 may be provided below the harness 64 or at the harness 64 on the rear side of the vehicle (i.e., on the outer cover portion 29 side).

Further, in the embodiment, an example in which the occupant protection device 15 is provided on the passenger seat 16 side of the vehicle compartment 12 has been described. However, the present invention is not limited thereto. For example, the occupant protection device 15 may also be disposed on the driver's seat side.

In addition, in the embodiment, an example in which the protrusion 46 is formed in a rectangular shape in a plan view has been described. However, the present invention is not limited thereto. For example, the protrusion rear end 46d on the front side of the vehicle may be formed to be inclined toward the outer wall 45, or may be formed in other shapes.

What is claimed is:

1. An occupant protection device which is disposed in parallel with an under-cover of an instrument panel and has a harness connected to an inflator disposed on a front side of the under-cover in a vehicle traveling direction to protect a knee portion of an occupant, comprising:
a case having a side wall on which the harness is disposed, and
a protrusion configured to extend from the side wall of the case toward a front of the under-cover in forward and backward direction of a vehicle, to come in contact with the under-cover, and to restrict movement of the under-cover to the front side in the forward and backward direction of the vehicle,
wherein the protrusion covers at least a part of the harness, and wherein an end portion of the protrusion on a rear side in the vehicle traveling direction is provided on a rear side of the harness.

2. The occupant protection device according to claim 1, wherein the harness is connected to the inflator by a connector.

3. The occupant protection device according to claim 1, wherein a lengthwise direction of the protrusion is a thickness direction of the case.

4. The occupant protection device according to claim 1, wherein the case has a cover portion which is opened by breaking a breakable portion including a perforated portion and a thinned portion, and a connection portion between the perforated portion and the thinned portion is disposed at a position of the protrusion along an extension line in the lengthwise direction.

5. An occupant protection device which is disposed in parallel with an under-cover of an instrument panel and has a harness connected to an inflator disposed on a front side of the under-cover in a vehicle traveling direction to protect a knee portion of an occupant, comprising:
a case having a side wall on which the harness is disposed, and
a protrusion configured to extend from the side wall of the case toward a front of the under-cover in a forward direction and a backward direction of the vehicle, to come in contact with the under-cover, and to restrict movement of the under-cover to a front side in the forward direction and the backward direction of the vehicle, wherein the case has a cover portion which is opened by breaking a breakable portion including a perforated portion and a thinned portion, and a connection portion between the perforated portion and the thinned portion that is disposed at a position of the protrusion along an extension line in a lengthwise direction.

* * * * *